(12) United States Patent  
Haans et al.

(10) Patent No.: US 8,376,704 B2
(45) Date of Patent: Feb. 19, 2013

(54) SYSTEMS AND METHOD OF ASSEMBLING AN AIR DISTRIBUTION SYSTEM FOR USE IN A ROTOR BLADE OF A WIND TURBINE

(75) Inventors: Wouter Haans, The Hague (NL); Jacob Johannes Nies, Zwolle (NL)

(73) Assignee: General Electric Company, Schenectady, NY (US)

( * ) Notice: Subject to any disclaimer, the term of this patent is extended or adjusted under 35 U.S.C. 154(b) by 622 days.

(21) Appl. No.: 12/613,287

(22) Filed: Nov. 5, 2009

(65) Prior Publication Data

US 2011/0103953 A1 May 5, 2011

(51) Int. Cl.
*F03D 1/06* (2006.01)
(52) U.S. Cl. ..................... 416/91; 416/231 R
(58) Field of Classification Search ............ 29/889.7, 29/889.72, 889.721; 290/44, 55; 415/115; 416/91, 93 R, 146 R, 231 B, 231 R, 232
See application file for complete search history.

(56) References Cited

U.S. PATENT DOCUMENTS

| | | | |
|---|---|---|---|
| 4,692,095 A | 9/1987 | Lawson-Tancred | |
| 5,791,601 A * | 8/1998 | Dancila et al. ................. | 244/207 |
| 5,938,404 A | 8/1999 | Domzalski et al. | |
| 6,629,674 B1 | 10/2003 | Saddoughi et al. | |
| 6,644,598 B2 * | 11/2003 | Glezer et al. ................. | 244/208 |
| 6,821,090 B1 * | 11/2004 | Hassan et al. ................. | 416/42 |
| 6,940,185 B2 | 9/2005 | Andersen et al. | |
| 6,972,498 B2 | 12/2005 | Jamieson et al. | |
| 7,354,247 B2 | 4/2008 | Bonnet | |
| 7,363,808 B2 | 4/2008 | Ormel et al. | |
| 7,387,491 B2 | 6/2008 | Saddoughi et al. | |
| 7,420,289 B2 | 9/2008 | Wang et al. | |
| 7,435,057 B2 * | 10/2008 | Parera ........................ | 416/231 R |
| 7,582,977 B1 | 9/2009 | Dehlsen | |
| 7,637,715 B2 | 12/2009 | Battisti | |
| 7,748,958 B2 * | 7/2010 | McVeigh et al. .................. | 416/1 |
| 2001/0038798 A1 | 11/2001 | Foster | |

(Continued)

FOREIGN PATENT DOCUMENTS

| | | |
|---|---|---|
| DE | 10 2006 032 387 A1 | 1/2008 |
| EP | 1517033 A1 | 3/2005 |

(Continued)

OTHER PUBLICATIONS

David F. Fisher & Michael C. Fischer, Development Flight Tests of Jetstar LFC Leading-Edge Flight Test Experiment, (NASA, Langley Research Center ed., 1987).

(Continued)

*Primary Examiner* — Ninh H Nguyen
*Assistant Examiner* — Liam McDowell
(74) *Attorney, Agent, or Firm* — James McGinness, Esq.; Armstrong Teasdale LLP

(57) ABSTRACT

A method of assembling an air distribution system for use in a rotor blade of a wind turbine wherein the rotor blade includes a sidewall extending from a blade root towards a blade tip. The method includes coupling a manifold to the sidewall, wherein the manifold extends from the blade root towards the blade tip and has a root end and an opposing tip end defining a passage from the root end to the tip end. A plurality of apertures is defined through the sidewall. The apertures provide flow communication between the passage and ambient air. A debris collector is coupled to the tip end of the manifold and is configured to collect debris flowing through the air distribution system.

20 Claims, 12 Drawing Sheets

U.S. PATENT DOCUMENTS

| | | |
|---|---|---|
| 2005/0042102 A1 | 2/2005 | Teichert |
| 2005/0242233 A1 | 11/2005 | Battisti |
| 2007/0231151 A1 | 10/2007 | Herr et al. |
| 2009/0035148 A1* | 2/2009 | Livingston et al. ........... 416/232 |
| 2009/0140862 A1 | 6/2009 | Eggleston |
| 2009/0304505 A1 | 12/2009 | Wobben |
| 2009/0311097 A1 | 12/2009 | Pierce et al. |
| 2010/0076614 A1 | 3/2010 | Nies et al. |
| 2010/0135790 A1 | 6/2010 | Pal et al. |
| 2010/0135794 A1 | 6/2010 | Nies et al. |
| 2010/0135795 A1 | 6/2010 | Nies et al. |
| 2010/0266382 A1* | 10/2010 | Campe et al. .................... 415/1 |

FOREIGN PATENT DOCUMENTS

| | | |
|---|---|---|
| GB | 2186033 A | 8/1987 |
| GB | 2466433 A | 6/2010 |
| WO | 2004092577 A1 | 10/2004 |
| WO | WO 2006069575 * | 7/2006 |
| WO | 2008080407 A1 | 7/2008 |
| WO | WO 2009025548 * | 2/2009 |

OTHER PUBLICATIONS

Gustave P. Corten & Herman F. Veldkamp, "Insects Can Halve Wind-Turbine Power," 412 Nature, 42-43 (2001).

Albert L. Braslow, "A History of Suction-Type Laminar-Flow Control with Emphasis on Flight Research," Monographs in Aerospace History, No. 13, pp. 20, 21, 24 (1999).

Hal Romanowitz, "Alternate Energy Systems Engineering," available at www.oakcreekenergy.com/reports/flash/GCI-20020401.html (last visited Mar. 2, 2009).

Office Action dated Oct. 5, 2010, U.S. Appl. No. 12/613,170, 21 pages.

Office Action dated Aug. 19, 2010, U.S. Appl. No. 12/613,274, 17 pages.

* cited by examiner

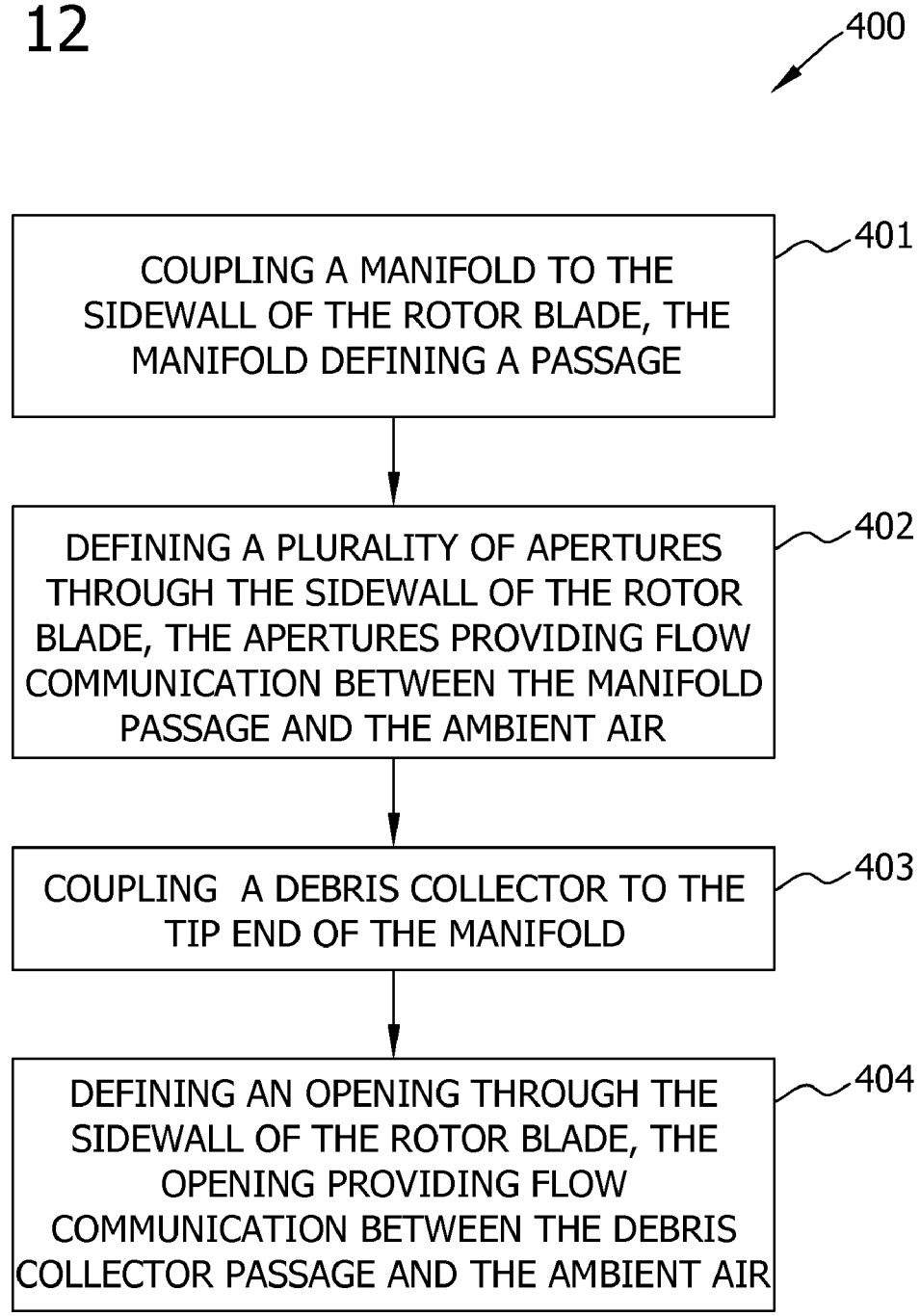

US 8,376,704 B2

SYSTEMS AND METHOD OF ASSEMBLING AN AIR DISTRIBUTION SYSTEM FOR USE IN A ROTOR BLADE OF A WIND TURBINE

CROSS REFERENCE TO RELATED APPLICATIONS

Cross-reference is hereby made to related, commonly assigned, co-pending applications: Ser. No. 12/613,079 entitled "Method for Operating a Wind Turbine with Reduced Blade Fouling" and issued as U.S. Pat. No. 8,092,172; Ser. No. 12/613,157 entitled "Active Flow Control System for Wind Turbine" and issued as U.S. Pat. No. 7,883,313; Ser. No. 12/613,013 entitled "Systems and Method for Operating a Wind Turbine Having Active Flow Control" and issued as U.S. Pat. No. 8,221,075; Ser. No. 12/613,268 entitled "Apparatus and Method for Cleaning an Active Flow Control (AFC) System of a Wind Turbine" and issued as U.S. Pat. No. 7,931,445; Ser. No. 12/613,170 entitled "Systems and Method for Operating an Active Flow Control System" and issued as U.S. Pat. No. 8,047,783; and Ser. No. 12/613,274 entitled "Systems and Method for Operating a Wind Turbine Having Active Flow Control" and published as U.S. Pub. No. 2010/0076614. Each cross-referenced application is invented by Jacob Johannes Nies and Wouter Haans and is filed on the same day as this application.

BACKGROUND OF THE INVENTION

The embodiments described herein relate generally to methods and systems for operating a wind turbine having an active flow control system and, more particularly, to methods and systems for collecting and removing debris from the active flow control system and/or preventing an accumulation of debris on and/or within the active flow control system.

Active Flow Control (AFC) is a general term for technologies and/or systems that actively attempt to influence an aerodynamic response of an object in reaction to given in-flow conditions. More specifically, at least some known AFC systems are used to manipulate flow conditions across a blade. As used herein, the term "airfoil" refers to a turbine blade, a wing, and/or any other suitably airfoil. In contrast to known passive flow control systems that provide substantially constant flow control, known AFC systems enable flow control to be selectively applied to an airfoil. At least some known AFC systems use air distribution systems to manipulate a boundary layer of air flowing across a surface of an airfoil. Known AFC systems include actuators that can be divided into two categories, depending on their net-mass-flow. The first category is zero-net-mass-flow actuators, such as synthetic jet actuators, and the second category is nonzero-net-mass-flow actuators, such as air ejection actuators, which may be steady or unsteady and/or blowing and/or suction actuators.

Because AFC systems are subjected to fluid flows that can contain debris, fouling of AFC perforations and/or apertures by debris is one of the obstacles for wide scale application of AFC on wind turbine blades, aircraft wings, and other airfoils. As used herein, the term "debris" refers to dirt, dust, insects, insect remains, particles, particulates, substances, suspended liquids and/or solids, and/or any other materials that may contact and accumulate in and/or on the wind turbine blades and/or other airfoils. Further, the terms "perforation" and "aperture" can be used interchangeably throughout this application.

In general, fouling of the AFC apertures by debris has an adverse effect on AFC system performance. Further, components, other than the perforations, of at least some known AFC systems are susceptible to fouling as well. For example, in at least some known nonzero-net-mass-flow systems, ambient air, possibly polluted with debris, is drawn into the AFC system to feed the actuators. Such polluted intake air may foul the air distribution system, the actuators, and/or the perforations of the AFC system.

Such fouling of the perforations and/or other components of known AFC systems may alter fluid flows across a blade such that the fluid flows deviate from clean-state fluid flows for which the blade is designed to yield. Additionally, fouling on blade surfaces and/or within AFC systems may reduce a power output of a system using airfoils and/or AFC system, such as a wind turbine. However, manually cleaning each aperture of an AFC system is not practical because of the number of apertures in at least some known AFC system and/or the duration of time that is required for the wind turbine to be offline for such manual cleaning.

Accordingly, it is desirable to provide a method and/or a system for cleaning an AFC system and/or preventing fouling of an AFC system. Moreover, such methods and/or systems preferably do not include manual cleaning of the AFC system and/or blade.

BRIEF DESCRIPTION OF THE INVENTION

In one aspect, a method of assembling an air distribution system for use in a rotor blade of a wind turbine is provided, wherein the rotor blade includes a sidewall extending from a blade root towards a blade tip. The method includes coupling a manifold to the sidewall, wherein the manifold extends from the blade root towards the blade tip and has a root end and an opposing tip end defining a passage from the root end to the tip end. A plurality of apertures is defined through the sidewall providing flow communication between the passage and ambient air. A debris collector is coupled to the tip end of the manifold and is configured to collect debris flowing through the air distribution system.

In another aspect, an air distribution system for use in a wind turbine is provided. The wind turbine includes at least one rotor blade with a sidewall at least partially defining a cavity extending from a blade root towards a blade tip. The air distribution system includes a manifold at least partially positioned within the cavity and extending from the blade root towards the blade tip and having a root end and an opposing tip end defining a passage from the root end to the tip end. A plurality of apertures is defined through the sidewall providing flow communication between the passage and ambient air. A debris collector is coupled to the tip end of the manifold and is configured to collect debris flowing through the air distribution system.

In yet another aspect, a wind turbine is provided. The wind turbine includes at least one rotor blade with a sidewall at least partially defining a cavity extending from a blade root towards a blade tip, and an air distribution system at least partially positioned within the rotor blade. The air distribution system includes a manifold at least partially positioned within the cavity and extending from the blade root towards the blade tip and having a root end and an opposing tip end defining a passage from the root end to the tip end. A plurality of apertures is defined through the sidewall and provides flow communication between the passage and ambient air. A debris collector is coupled to the tip end of the manifold and is configured to collect debris flowing through the air distribution system.

By including a debris collector, the embodiments described herein facilitate cleaning and maintaining an active flow control system within a blade of a wind turbine. More specifically, debris is collected from the air distribution system for correcting and/or preventing fouling of the air distribution system.

BRIEF DESCRIPTION OF THE DRAWINGS

FIGS. 1-12 show exemplary embodiments of the systems and method described herein.

FIG. 1 is a perspective view of an exemplary wind turbine.

FIG. 2 is a partial view of the wind turbine shown in FIG. 1 including an exemplary flow control system.

FIG. 3 is a perspective view of a portion of an exemplary air distribution system suitable for use with the wind turbine shown in FIG. 1.

FIG. 4 is an enlarged cross-sectional view of a debris collector suitable for use with the air distribution system shown in FIG. 3.

FIG. 5 is an enlarged cross-sectional view of an alternative embodiment of a debris collector suitable for use with the air distribution system shown in FIG. 3.

FIG. 6 is an enlarged cross-sectional view of an alternative embodiment of a debris collector suitable for use with the air distribution system shown in FIG. 3.

FIG. 7 is an enlarged cross-sectional view of a plurality of apertures defined through a sidewall of the rotor blade shown in FIG. 2.

FIG. 8 is an enlarged cross-sectional view of an alternative embodiment of a plurality of apertures defined through a sidewall of the rotor blade shown in FIG. 2.

FIG. 9 is an enlarged cross-sectional view of an alternative embodiment of a plurality of apertures defined through a sidewall of the rotor blade shown in FIG. 2.

FIG. 10 is a partial view of the wind turbine shown in FIG. 1 including an exemplary alternative flow control flow control system.

FIG. 11 is an enlarged cross-sectional view of an aperture of the air distribution system shown in FIG. 10.

FIG. 12 is a flowchart of an exemplary method for assembling an air distribution system suitable for use with the wind turbine shown in FIG. 1.

DETAILED DESCRIPTION OF THE INVENTION

The embodiments described herein include an active flow control (AFC) system that ejects air through surface apertures and/or perforations to facilitate controlling flow separation on an airfoil, such as a wind turbine rotor blade. The methods and systems described herein facilitate correcting and/or preventing fouling of the AFC system and/or rotor blade surfaces. More specifically, the embodiments described herein prevent debris from collecting in the AFC system apertures and manifolds. Rather, debris is channeled to a debris collector to enable the debris to be removed from the AFC system. In one embodiment, the debris collector is configured to collect debris from the air distribution system of the AFC system. In a further embodiment, the apertures are configured to prevent debris within the AFC system from entering the apertures to facilitate collecting or accumulating the debris in the debris collector for removal. In an alternative embodiment, each aperture is configured to prevent debris from entering the aperture from outside the rotor blade surface.

Figure 1:
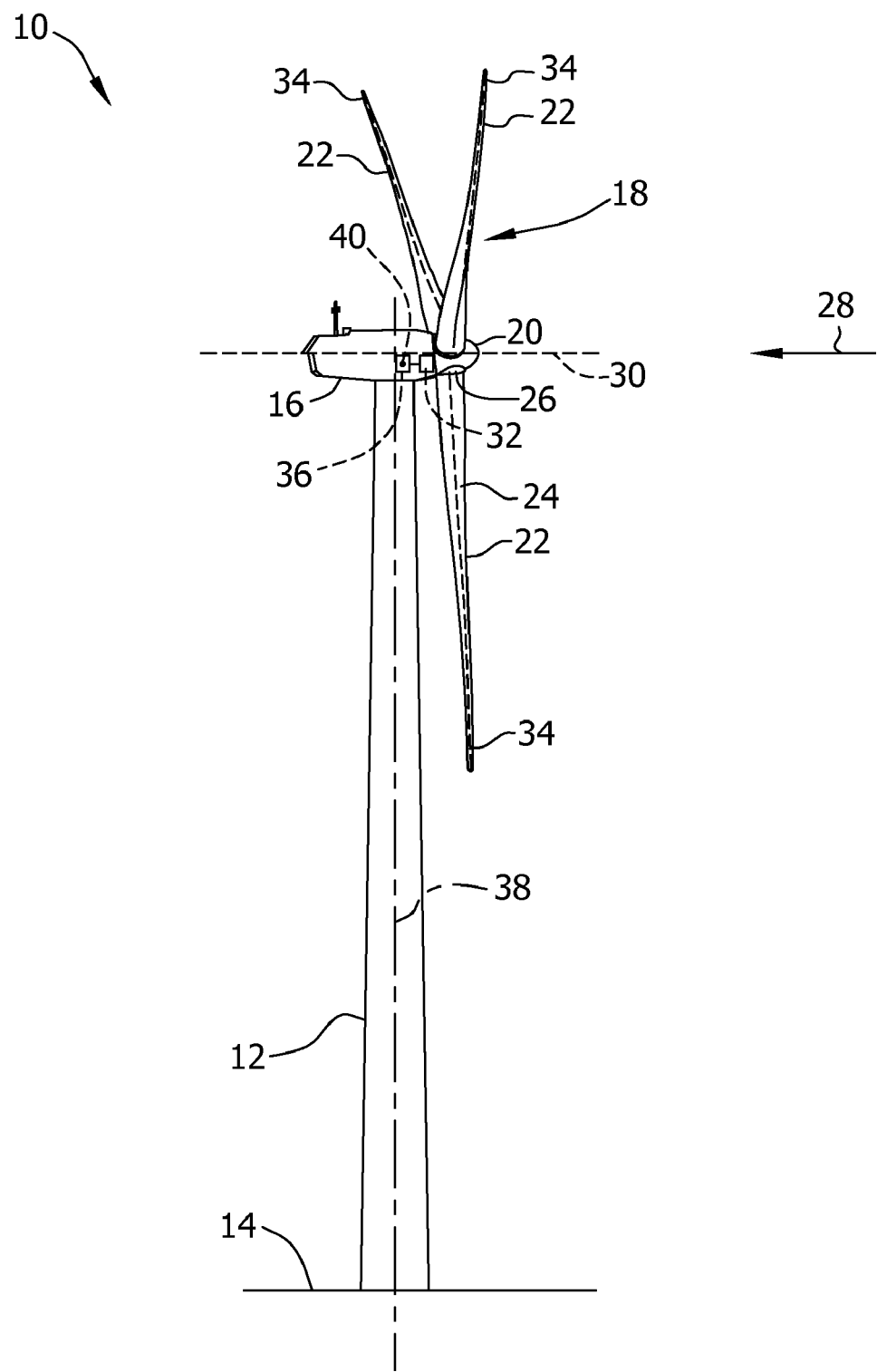

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a supporting surface 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel such that a cavity (not shown in FIG. 1) is defined between supporting surface 14 and nacelle 16. In an alternative embodiment, tower 12 is any suitable type of tower. A height of tower 12 is selected based upon factors and conditions known in the art.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In the exemplary embodiment, rotor blades 22 have a length ranging from about 30 meters (m) (99 feet (ft)) to about 120 m (394 ft). Alternatively, rotor blades 22 may have any suitable length that enables wind turbine 10 to function as described herein. For example, other non-limiting examples of blade lengths include 10 m or less, 20 m, and 37 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. Moreover, a pitch angle of rotor blades 22, i.e., an angle that determines a perspective of rotor blades 22 with respect to a rotor plane, may be changed by a pitch adjustment system 32 to control the load and power generated by wind turbine 10 by adjusting an angular position of a profile of at least one rotor blade 22 relative to wind vectors. Pitch axes 34 for rotor blades 22 are illustrated. In the exemplary embodiment, a pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on supporting surface 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, flow control system control commands. The execution of sequences of instructions is not limited to any specific combination of hardware circuitry and software instructions.

Figure 2:
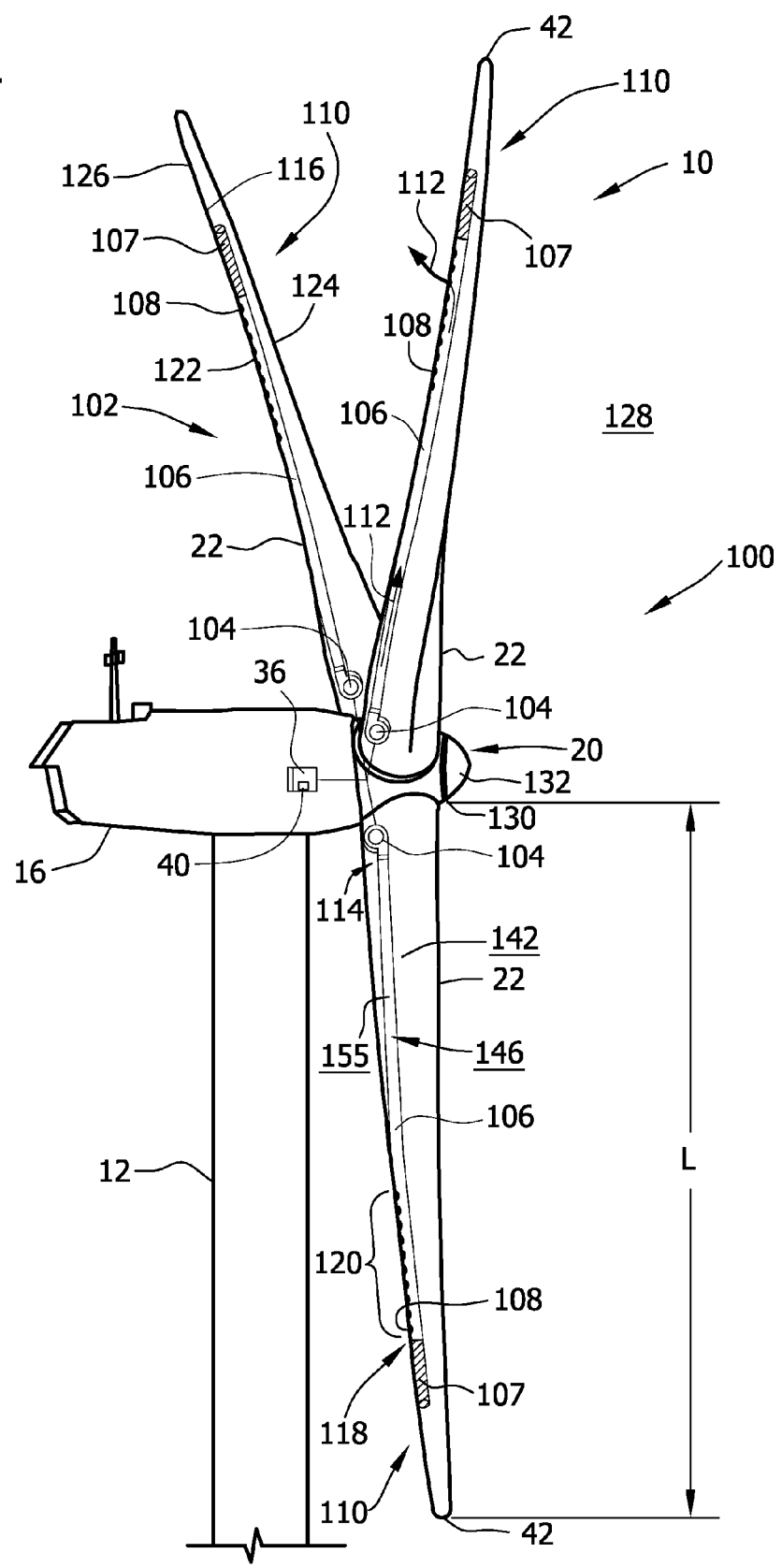
Figure 3:
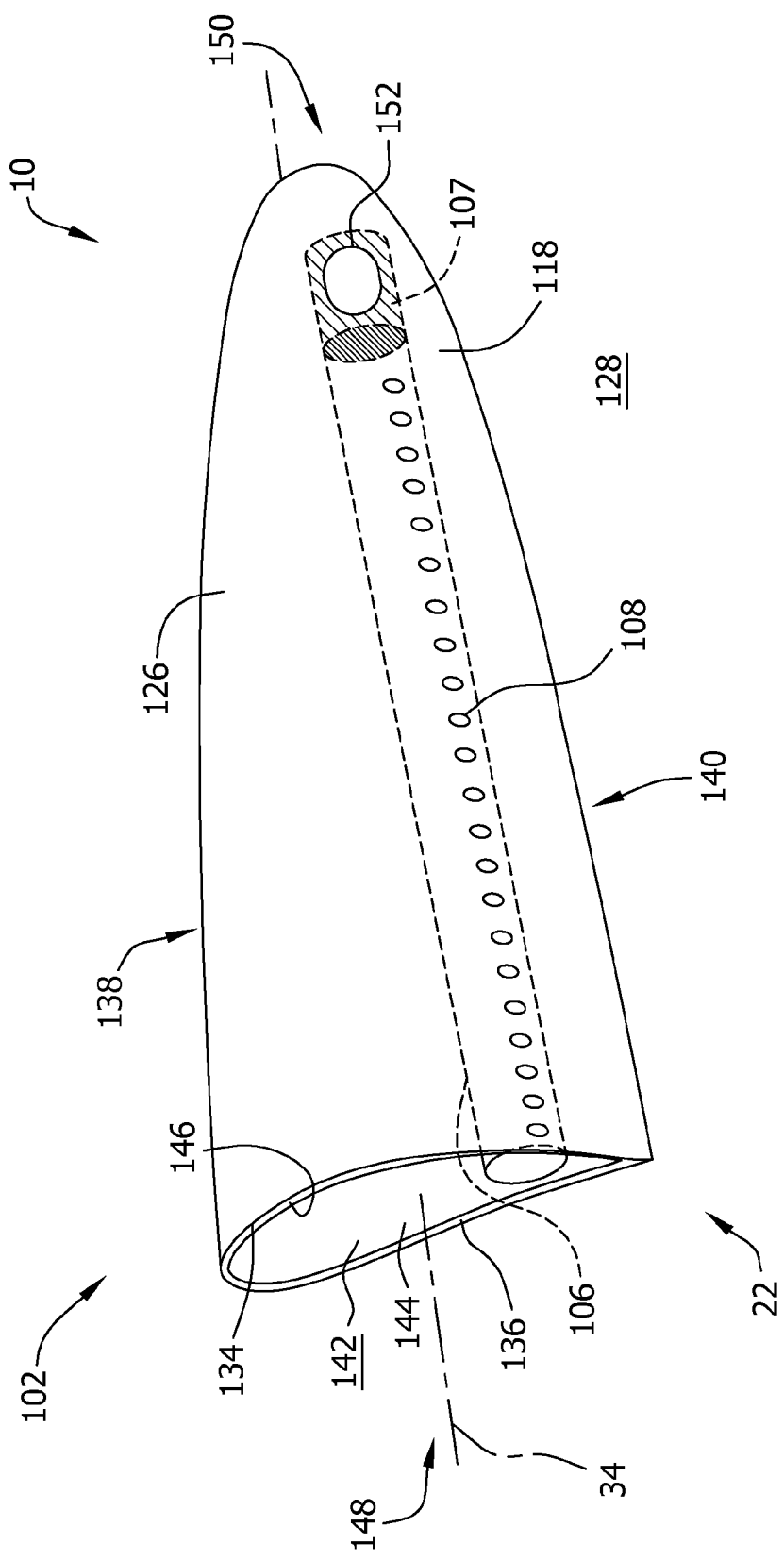

FIG. 2 is a schematic view of an exemplary flow control system 100 that may be used with wind turbine 10. FIG. 3 is a perspective view of a portion of an exemplary air distribution system 102 suitable for use with wind turbine 10. Components shown in FIG. 1 are labeled with similar reference numbers in FIG. 2 and FIG. 3. In the exemplary embodiment, flow control system 100 is a nonzero-net-mass flow control system that includes air distribution system 102. Control system 36 is considered to be a component of flow control system 100 and is in operational control communication with air distribution system 102. As used herein, "operational control communication" refers to a link, such as a conductor, a wire, and/or a data link, between two or more components of wind turbine 10 that enables signals, electric currents, and/or commands to be communicated between the two or more components. The link is configured to enable one component to control an operation of another component of wind turbine 10 using the communicated signals, electric currents, and/or commands.

Air distribution system 102 includes at least one flow control device 104, at least one manifold 106, and at least one aperture 108. At least one flow control device 104, a respective manifold 106, and one or more corresponding apertures 108 form an assembly 110. Each rotor blade 22 includes an assembly 110 at least partially defined therein. As such, air distribution system 102 includes a plurality of flow control devices 104, a plurality of manifolds 106, and a plurality of apertures 108. Alternatively, at least one rotor blade 22 includes an assembly 110. In the exemplary embodiment, each assembly 110 is substantially similar, however, at least one assembly 110 may be different than at least one other assembly 110. Further, although in the exemplary embodiment each assembly 110 includes a flow control device 104, at least two assemblies 110 may share a common flow control device 104.

Flow control device 104 is, for example, a pump, a compressor, a fan, a blower, and/or any other suitable device for controlling a flow of a fluid. In one embodiment, flow control device 104 and/or assembly 110 includes a valve (not shown) that is configured to regulate a flow within air distribution system 102, such as a flow rate and/or a flow direction. In the exemplary embodiment, flow control device 104 is reversible for changing a direction of a fluid flow 112. Further, in the exemplary embodiment, air distribution system 102 includes one flow control device 104 for each rotor blade 22 of wind turbine 10, however, it should be understood that air distribution system 102 can include any suitable number of flow control devices 104. Control system 36 is operatively coupled to flow control device 104. Control system 36 is in operational control communication with each flow control device 104 for controlling fluid flows through air distribution system 102. Control system 36 may be directly coupled in operational control communication with each flow control device 104 and/or may be coupled in operational control communication with each flow control device 104 via a communication hub and/or any other suitable communication device(s).

Each flow control device 104 is in flow communication with at least one manifold 106. When one centralized flow control device 104 is used, flow control device 104 is in flow communication with each manifold 106 of air distribution system 102. In the exemplary embodiment, a flow control device 104 is coupled within a respective rotor blade 22 at a root end 114 of each manifold 106. Alternatively, flow control device 104 may in any suitable positioned within wind turbine 10 and/or on supporting surface 14 (shown in FIG. 1) with respect to at least one manifold 106.

In the exemplary embodiment, each manifold 106 is at least partially defined within cavity 142 and positioned at or near an interior surface 116 within respective rotor blade 22 and extends generally along a respective pitch axis 34 (shown in FIG. 1) from root end 114 of manifold 106 to an opposing tip end 118 of manifold 106. It should be understood that tip end 118 is not necessarily positioned within a tip 42 of rotor blade 22, but rather, is positioned nearer to tip 42 than manifold root end 114. A flow passage 155 is defined within manifold 106. In one embodiment, apertures 108 are defined at a predetermined portion 120 of a length L of rotor blade 22 from root end 114 within tip end 118. Further, it should be understood that manifold 106 may have any suitable configuration, cross-sectional shape, length, and/or dimensions that enables air distribution system 102 and/or flow control system 100 to function as described herein. It should also be understood that one or more components of blade 22 can be used to form manifold 106.

In the exemplary embodiment, air distribution system 102 also includes at least one debris collector 107 coupled to manifold 106. More specifically, debris collector 107 is at least partially defined within a respective rotor blade 22 and extends generally along respective pitch axis 34 from tip end 118 of manifold 106 towards tip 42 of rotor blade 22. In the exemplary embodiment, debris collector 107 is positioned at tip end 118 of manifold 106. However, in an alternative embodiment, debris collector 107 is located at any suitable position along respective pitch axis 34. Further, it should be understood that debris collector 107 may have any suitable configuration, cross-sectional shape, length, and/or dimensions that enable air distribution system 102 and/or flow control system 100 to function as described herein.

In the exemplary embodiment, air distribution system 102 also includes at least one aperture 108 providing flow communication between a passage defined 155 and ambient air 128. More specifically, in the exemplary embodiment, air distribution system 102 includes a plurality of apertures 108 defined along a suction side 122 of each respective rotor blade 22. Although apertures 108 are shown as being aligned in a line along suction side 122, it should be understood that apertures 108 may be positioned at any suitable location along suction side 122 of rotor blade 22 that enables flow control system 100 to function as described herein. Alternatively or additionally, apertures 108 are defined through a pressure side 124 of rotor blade 22. In the exemplary embodiment, apertures 108 are defined though an outer surface 126 of respective rotor blade 22 for providing flow communication between manifold 106 and ambient air 128.

In the exemplary embodiment, flow control devices 104 are, in the exemplary embodiment, in flow communication with ambient air 128 via an opening 130 defined between hub 20 and a hub cover 132. Alternatively, wind turbine 10 does not include hub cover 132, and ambient air 128 is drawn into air distribution system 102 through an opening 130 near hub 20. In the exemplary embodiment, flow control devices 104 are configured to draw in ambient air 128 though opening 130 and to discharge fluid flow 112 generated from ambient air 128 into manifold 106. Debris suspended in ambient air 128 is also drawn in by flow control devices 104 through opening 130 and discharged with fluid flow 112 through manifold 106. Alternatively, opening 130 may be defined at any suitable location within hub 20, nacelle 16, rotor blade 22, tower 12, and/or an auxiliary device (not shown) that enables air distribution system 102 to function as described herein. Further, air distribution system 102 may include more than one opening 130 for drawing air into air distribution system 102, such as including one or more openings 130 for each flow control device 104. In an alternative embodiment, a filter is positioned within opening 130 for filtering ambient air 128 entering air distribution system 102. It should be understood that the filter referred to herein can filter particles from a fluid flow and/or separate liquid from the fluid flow.

During a flow control operation, flow control system 100 is used to provide AFC for wind turbine 10. More specifically, control system 36 controls air distribution system 102 to draw in ambient air 128 and discharge a fluid flow 112 through at least one aperture 108. Operation of one assembly 110 will be described herein, however, it should be understood that each assembly 110 may function similarly. Further, assemblies 110 can be controlled to operate in substantial synchronicity or each assembly 110 may be controlled separately such that a fluid flow about each rotor blade 22 may be manipulated separately. When assemblies 110 are controlled in synchronicity, flow control system 100 can be controlled by control system 36 to maintain a predetermined load spectrum, power level, and/or noise level. In the exemplary embodiment, control system 36 instructs or controls flow control device 104 to draw in ambient air 128 to generate fluid flow 112 having one or more predetermined parameters, such as a velocity, a mass flow rate, a pressure, a temperature, and/or any suitable flow parameter. Flow control device 104 channels fluid flow 112 through manifold 106 from root end 114 to tip end 118. It should be understood that any suitable control methods and/or components, such as pitching rotor blade(s) 22, can alternatively or additionally be used to control a load spectrum, a power level, and/or a noise level of wind turbine 10.

As fluid flow 112 is channeled through manifold 106, fluid flow 112 is discharged from air distribution system 102 through apertures 108. Discharged fluid flow 112 facilitates manipulating at least a boundary layer of a fluid flow across outer surface 126 of rotor blade 22. More specifically, discharging fluid flow 112 at suction side 122 of rotor blade 22 increases a lift on rotor blade 22, which increases the power generated by wind turbine 10. Alternatively, flow control device 104 may be operated to draw in ambient air 128 through aperture 108 into manifold 106 for discharge from nacelle 16, hub 20, and/or any other suitable location. As such, ambient air 128 may be drawn in from the boundary layer to manipulate the boundary layer.

Referring to FIG. 3, in the exemplary embodiment, rotor blades 22 are identical and each includes a first sidewall 134 and a cooperating second sidewall 136. Second sidewall 136 is coupled to first sidewall 134 along a leading edge 138 and along an axially-spaced trailing edge 140. First sidewall 134 and second sidewall 136 are coupled together to define a cavity 142 between first sidewall 134 and second sidewall 136. Specifically, cavity 142 is bordered at least in part by inner surface 144 and inner surface 146 of each respective sidewall 134 and 136. Manifold 106 is defined within, such as positioned within, respective rotor blade 22 and extends generally along respective pitch axis 34 from blade root 148 towards blade tip 150. In the exemplary embodiment, Manifold 106 is positioned at or near trailing edge 140 of rotor blade 22. In an alternative embodiment, manifold 106 is positioned at or near leading edge 138 and/or trailing edge 140 of rotor blade 22. Manifold 106 is coupled to inner surface 146 of first sidewall 134 and/or inner surface 146 of second sidewall 136. In the exemplary embodiment, at least one opening 152 is defined though sidewall 134 or 136 of rotor blade 22 to provide flow communication between debris collector 107 and ambient air 128.

A plurality of apertures 108 extend through first sidewall 134 and/or second sidewall 136 to provide flow communication between manifold 106 and ambient air 128. In the exemplary embodiment, apertures 108 are aligned axially in a single row along rotor blade 22. It should be understood that apertures 108 can be aligned in any suitable array, in a single row, or in multiple rows at any suitable location along the length of rotor blade 22 that enables air distribution system 102 to function as described herein.

Figure 4:
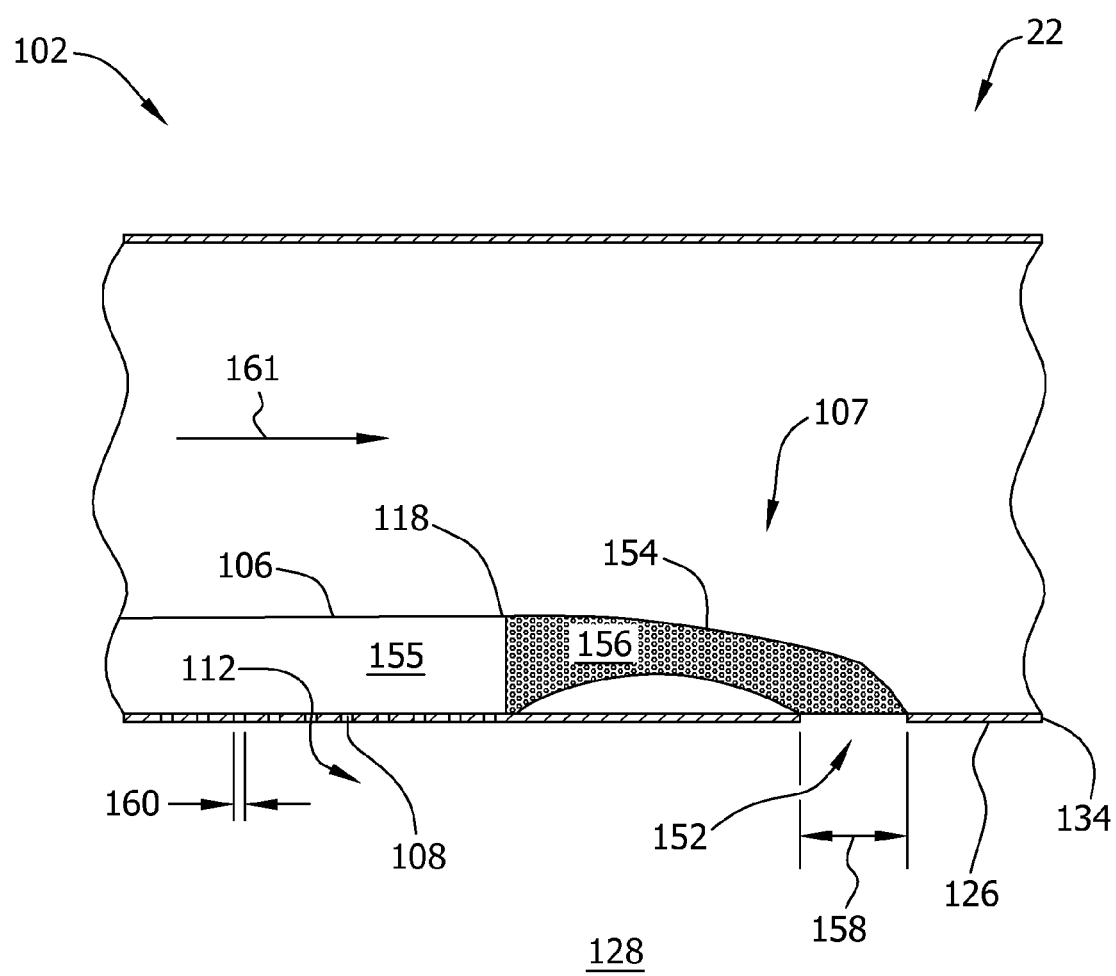

FIG. 4 is an enlarged cross-sectional view of an exemplary debris collector 107 of air distribution system 102. Components shown in FIG. 2 and FIG. 3 are labeled with similar reference numbers in FIG. 4. In the exemplary embodiment, debris collector 107 includes a member 154 that extends from manifold 106 towards blade tip 150. In an exemplary embodiment, member 154 is tubular. A debris passage 156 is defined within member 154 and is in flow communication with manifold passage 155. At least one opening 152 extends through sidewall 134 of rotor blade 22 to provide flow communication between debris passage 156 and ambient air 128. Debris collector 107 is coupled to tip end 118 of manifold 106 such that debris collector 107 is in flow communication with manifold 106. Apertures 108 are defined through first sidewall 134 of rotor blade 22 such that manifold passage 155 is in flow communication with ambient air 128. Opening 152 is defined within first sidewall 134 and through outer surface 126 such that debris passage 156 is in flow communication with ambient air 128. Opening 152 has a diameter 158 that is larger than a diameter 160 of each aperture 108. In the exemplary embodiment, air distribution system 102 includes a light detection system (not shown). Control system 36 (shown in FIG. 1) is in operational control communication with the light detection system to indicate when debris has accumulated in debris collector 107. Alternatively, air distribution system 102 includes a plurality of sensors (not shown) configured to determine one or more predetermined parameters of air distribution system 102, such as a velocity, a mass flow rate, a pressure, a temperature, and/or any suitable flow parameter. Control system 36 is in operational control communication with the plurality of sensors to indicate when a parameter of air distribution system 102 is not within predetermined limits due to the accumulation of debris in debris collector 107.

During flow control operation, fluid flow 112 is channeled through manifold 106 and is discharged from air distribution system 102 through apertures 108. Flow control devices 104

(shown in FIG. 2) are configured to draw in ambient air 128 though opening 130 (shown in FIG. 2) and to discharge fluid flow 112 generated from ambient air 128 into respective manifold 106. As ambient air 128 is drawn in through opening 130 (shown in FIG. 2), debris is also drawn in and becomes mixed with fluid flow 112 and discharged into manifold 106. As fluid flow 112 travels through manifold 106, debris is carried by centrifugal force, represented by arrow 161, generated by the rotation of rotor 18 (shown in FIG. 1), through manifold 106 to debris collector 107 and discharged through opening 152. Fluid flow 112 is discharged through apertures 108. Opening 152 is configured to provide a least restrictive flow path causing debris to flow past apertures 108 to be collected in debris collector 107 and/or discharged through opening 152. The accumulation of debris in debris collector 107 will disrupt a pulse of light emitted at regular intervals by the light detection system, such that debris will be indicated as being collected in debris collector 107.

Figure 5:
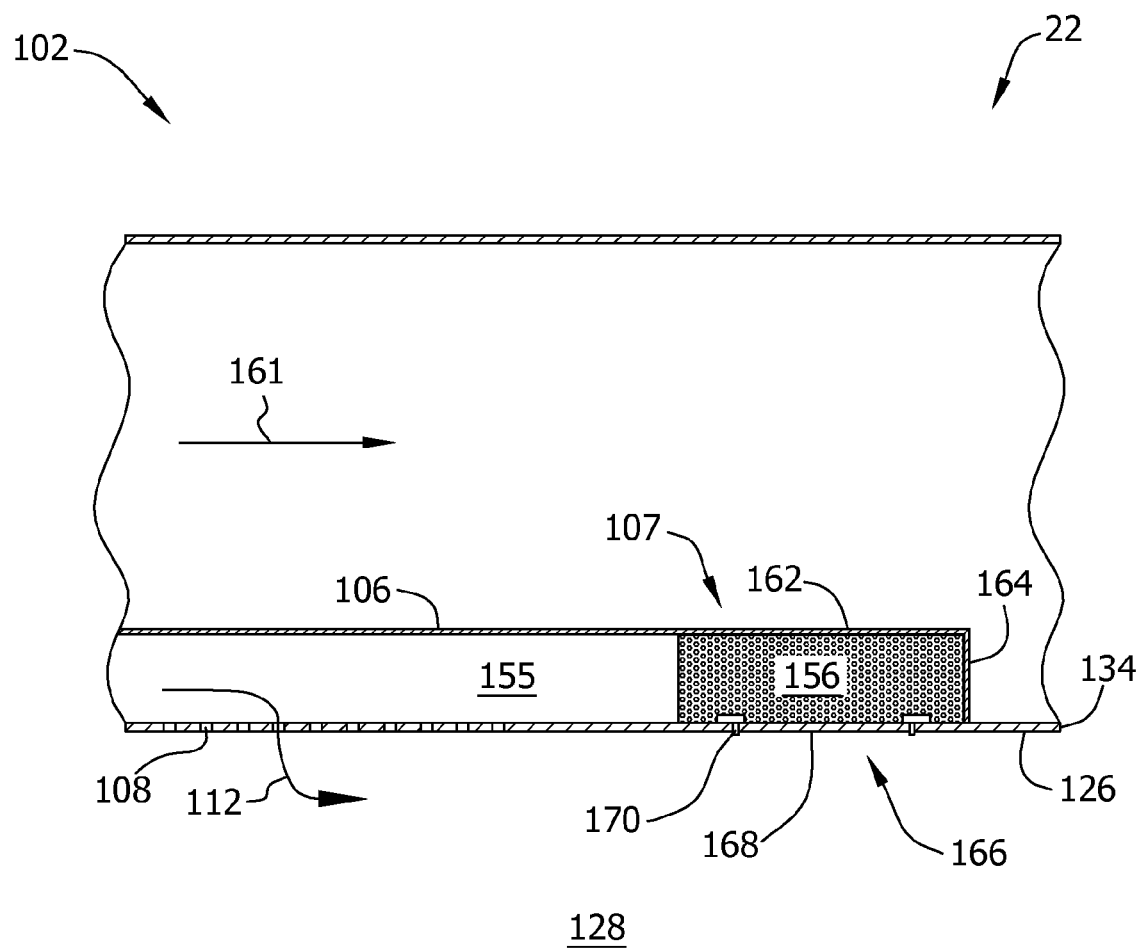

FIG. 5 is an enlarged cross-sectional view of an alternative embodiment of debris collector 107. Components shown in FIG. 2 and FIG. 3 are labeled with identical reference numbers in FIG. 5. In this alternative embodiment, debris collector 107 includes member 162 that extends radially outward from manifold 106 towards rotor blade tip 150. Member 162 partially defines debris passage 156 that terminates at an end wall 164. In one embodiment, end wall 164 is coupled to member 162 and is perpendicular to member 162. In an alternative embodiment, end wall 164 is oblique to member 162 (shown in FIG. 6). At least one opening 166 extends through first sidewall 134 of rotor blade 22 and provides flow communication between debris passage 156 and ambient air 128. A hatch 168 is removably coupled and/or pivotally coupled to member 162 and configured to cover opening 166, as desired. Hatch 168 is movable from a first, or closed, position to a second, or open, position. In the first position, hatch 168 covers opening 166. In the second position, hatch 168 does not completely cover opening 166 and provides flow communication between debris passage 156 and ambient air 128. In an alternative embodiment, hatch 168 is coupled to outer surface 126 with removable brackets 170. During operation, debris entering manifold 106 through air distribution system 102 is discharged into debris collector 107 by centrifugal force 161 generated by rotor 18 (shown in FIG. 1). When debris has collected in debris collector 107, hatch 168 is moved from the first position to the second position to allow manual access to debris passage 156 to remove the debris from debris collector 107.

Figure 6:
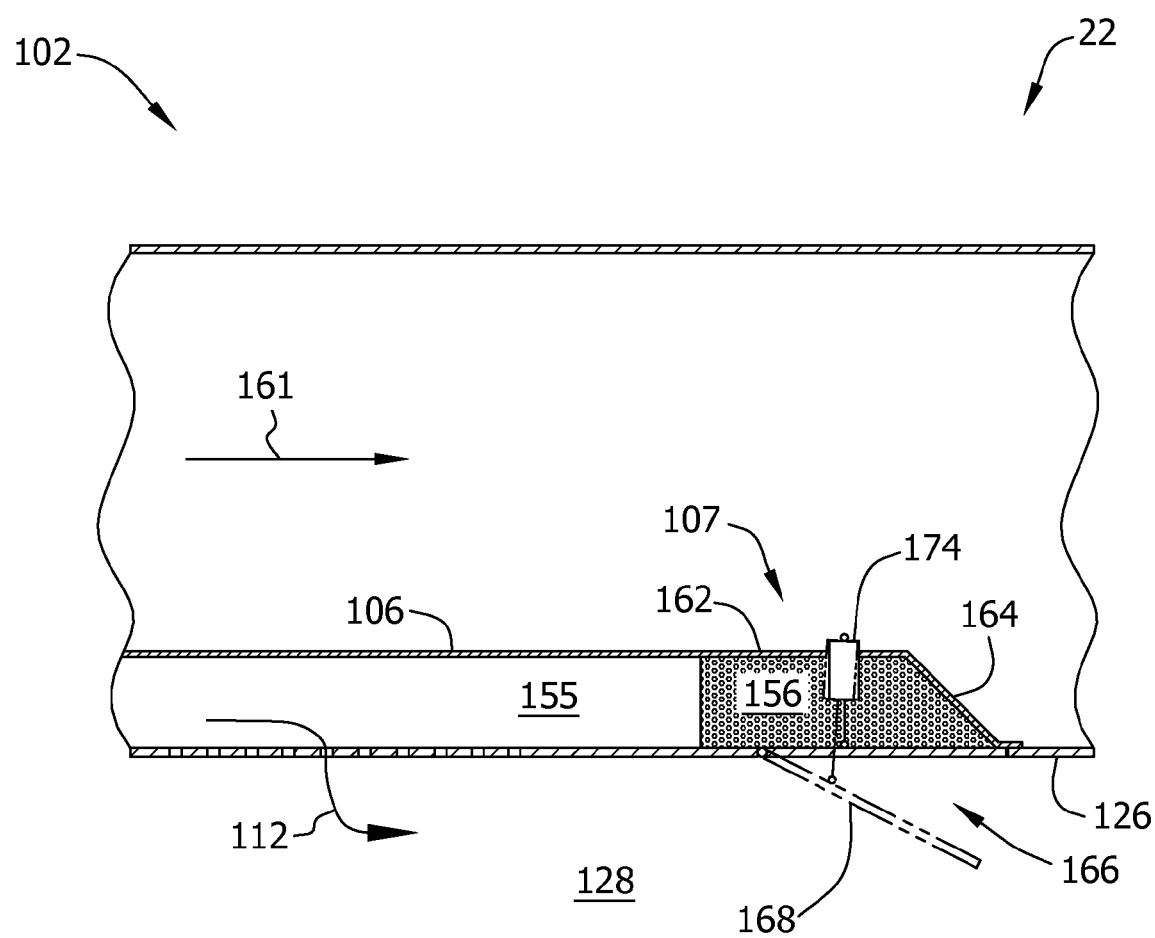

FIG. 6 is an enlarged cross-sectional view of an alternative embodiment of debris collector 107. Components shown in FIGS. 2, 3, and 5 are labeled with identical reference numbers in FIG. 6. In this alternative embodiment, an actuator 174 is operatively coupled to hatch 168. Actuator 174 is configured to move hatch 168 between the first, or closed, position and the second, or open, position, shown in phantom lines in FIG. 6. In the first position, hatch 168 covers opening 166, and in the second position, hatch 168 does not completely cover opening 166 and provides flow communication between debris passage 156 and ambient air 128. A communication link (not shown) is coupled to actuator 174 and provides operational control communication between control system 36 (shown in FIG. 1) and actuator 174. During operation, debris entering manifold 106 through air distribution system 102 is discharged into debris collector 107 by centrifugal force 161 generated by the rotation of rotor 18 (shown in FIG. 1). When debris has collected in debris collector 107, control system 36 operates actuator 174 to open hatch 168 from the first position to the second position. Debris is discharged through opening 166 by centrifugal force 161.

Figure 7:
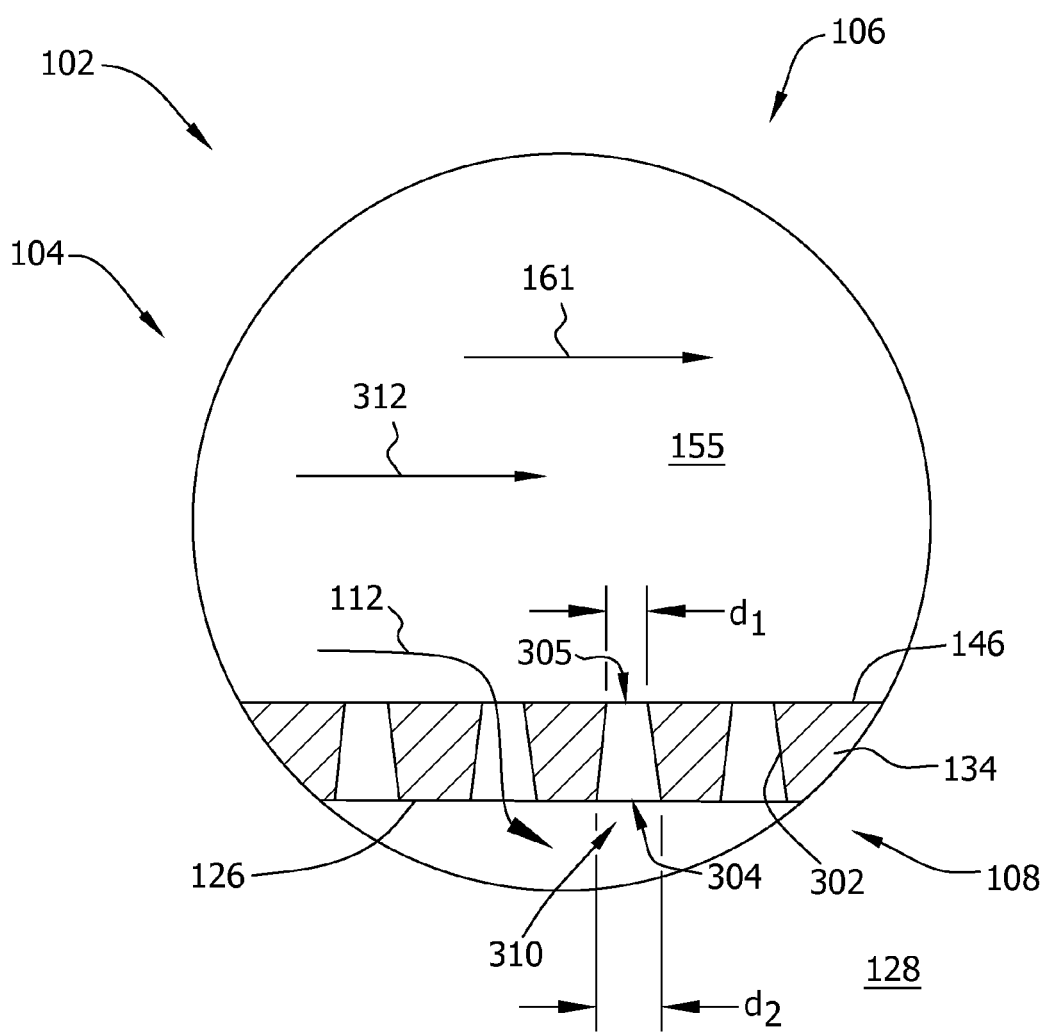

FIG. 7 is an enlarged cross-sectional view of a plurality of apertures 108 defined through first sidewall 134 of rotor blade 22. Components shown in FIG. 2 and FIG. 3 are labeled with identical reference numbers in FIG. 7. Apertures 108 are defined by a surface 302 extending through first sidewall 134 between inner surface 146 and outer surface 126. Aperture opening 304 is defined at or within blade outer surface 126. Aperture opening 305 is defined at or within blade inner surface 146. Aperture opening 305 is configured with a first or inside diameter $d_1$. Aperture opening 304 is configured with a second or outside diameter $d_2$ that is larger than first diameter $d_1$ such that a divergent opening 310 is formed through sidewall 134. In the exemplary embodiment, manifold passage 155 is in flow communication with ambient air 128 via apertures 108. During operation of air distribution system 102, flow control device 104 channels fluid flow 112 through manifold 106. Debris, represented by arrow 312, suspended in fluid flow 112 is channeled through manifold 106. As fluid flow 112 is channeled through manifold 106, fluid flow 112 is discharged from air distribution system 102 through apertures 108. As debris 312 is channeled through manifold 106, inner diameter $d_1$ of opening 305 restricts debris 312 from entering aperture 108, separating debris 312 from fluid flow 112. Debris 312 is then carried by centrifugal force 161 generated by the rotation of rotor 18 (shown in FIG. 1) through manifold 106 downstream to debris collector 107. Debris that enters aperture 108 with a diameter smaller than inner diameter $d_1$ of opening 305 is channeled by fluid flow 112 out through aperture opening 304, that has an outside diameter $d_2$ that is larger than the diameter of opening 305, such that the debris does not restrict and/or block flow through aperture 108.

Figure 8:
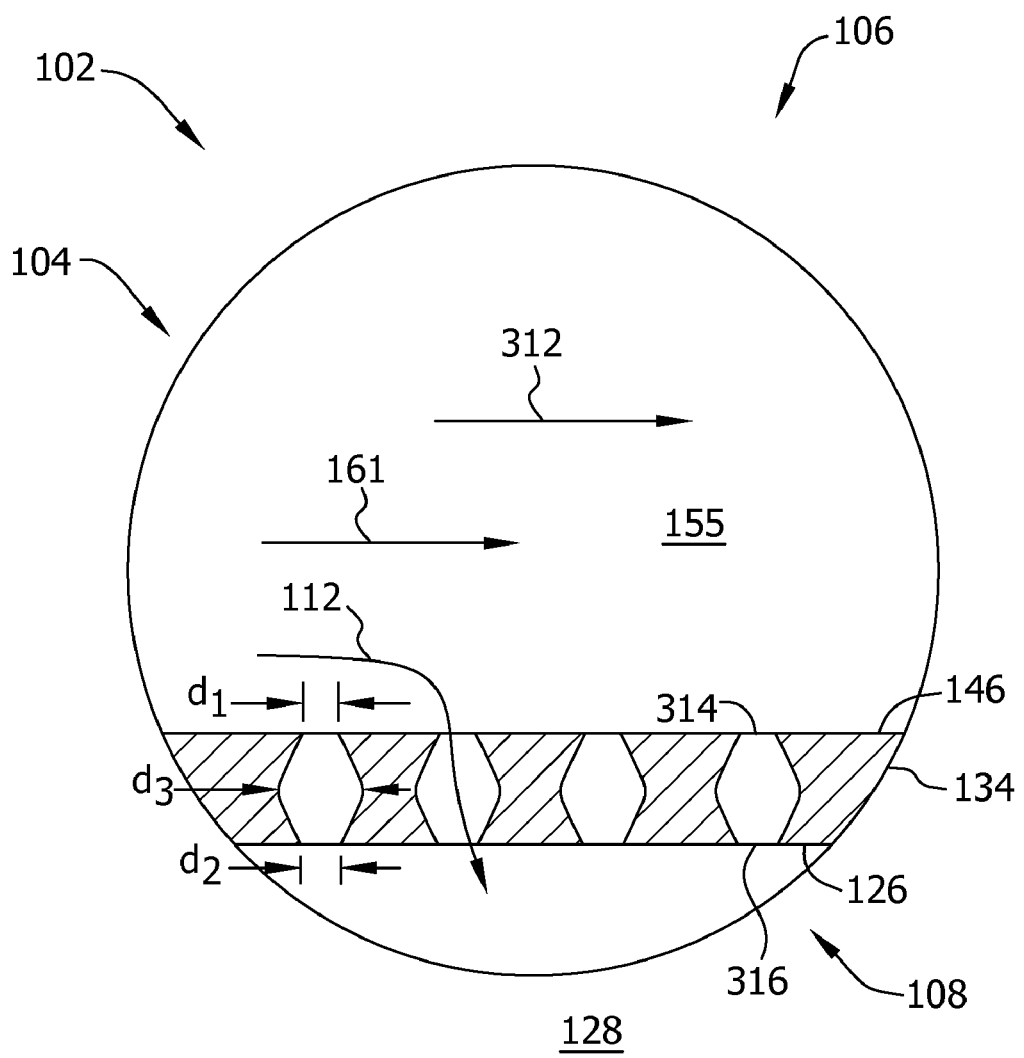

FIG. 8 is an enlarged cross-sectional view of an alternative embodiment of apertures 108 defined through first sidewall 134 of rotor blade 22. Components shown in FIGS. 2, 3 and 7 are labeled with identical reference numbers in FIG. 8. In an alternative embodiment, apertures 108 include an interior opening 314 defined at or within inner surface 146, and an exterior opening 316 defined at or within outer surface 126. Interior opening 314 is configured with a first or inside diameter $d_1$. Exterior opening 316 is configured with a second or outside diameter $d_2$. A third diameter $d_3$ is defined at a midsection of aperture 108. Third diameter $d_3$ is larger that first diameter $d_1$ and second diameter $d_2$. In this alternative embodiment, third diameter $d_3$ is positioned at a midpoint along a length of aperture 108 between inner surface 146 and outer surface 126. However, it should be understood that third diameter $d_3$ can be defined at any suitable position between interior opening 314 and exterior opening 316 to allow air distribution system 102 to function as described herein. In this alternative embodiment, first diameter $d_1$ is the same size as second diameter $d_2$, however, in an alternative embodiment, first diameter $d_1$ may be smaller or larger than second diameter $d_2$.

During operation of air distribution system 102, flow control device 104 channels ambient air 128 through manifold 106. Debris 312 suspended in fluid flow 112 is channeled through manifold 106. As fluid flow 112 is channeled through manifold 106, interior opening 314 restricts debris 312 from entering aperture 108, separating debris 312 from fluid flow 112. Debris 312 is then carried by centrifugal force 161 generated by the rotation of rotor 18 (shown in FIG. 1) through manifold 106 to debris collector 107. In addition, flow control device 104 operates to draw in ambient air 128 through aperture 108 into manifold 106. Exterior opening 316 facilitates preventing debris suspended in ambient air 128 from entering aperture 108. Debris that enters aperture 108 with a diameter smaller than inner diameter $d_1$ of interior opening 314 is channeled by fluid flow 112 out through exterior opening 316 that has a diameter $d_2$ that is substantially similar to the diameter of interior opening 314, such that the debris does not restrict and/or block flow through aperture 108. In addition, debris that enters aperture 108 through exterior opening 316 is channeled by fluid flow 112 out through interior opening 314, such that the debris does not restrict and/or block flow through aperture 108.

Figure 9:
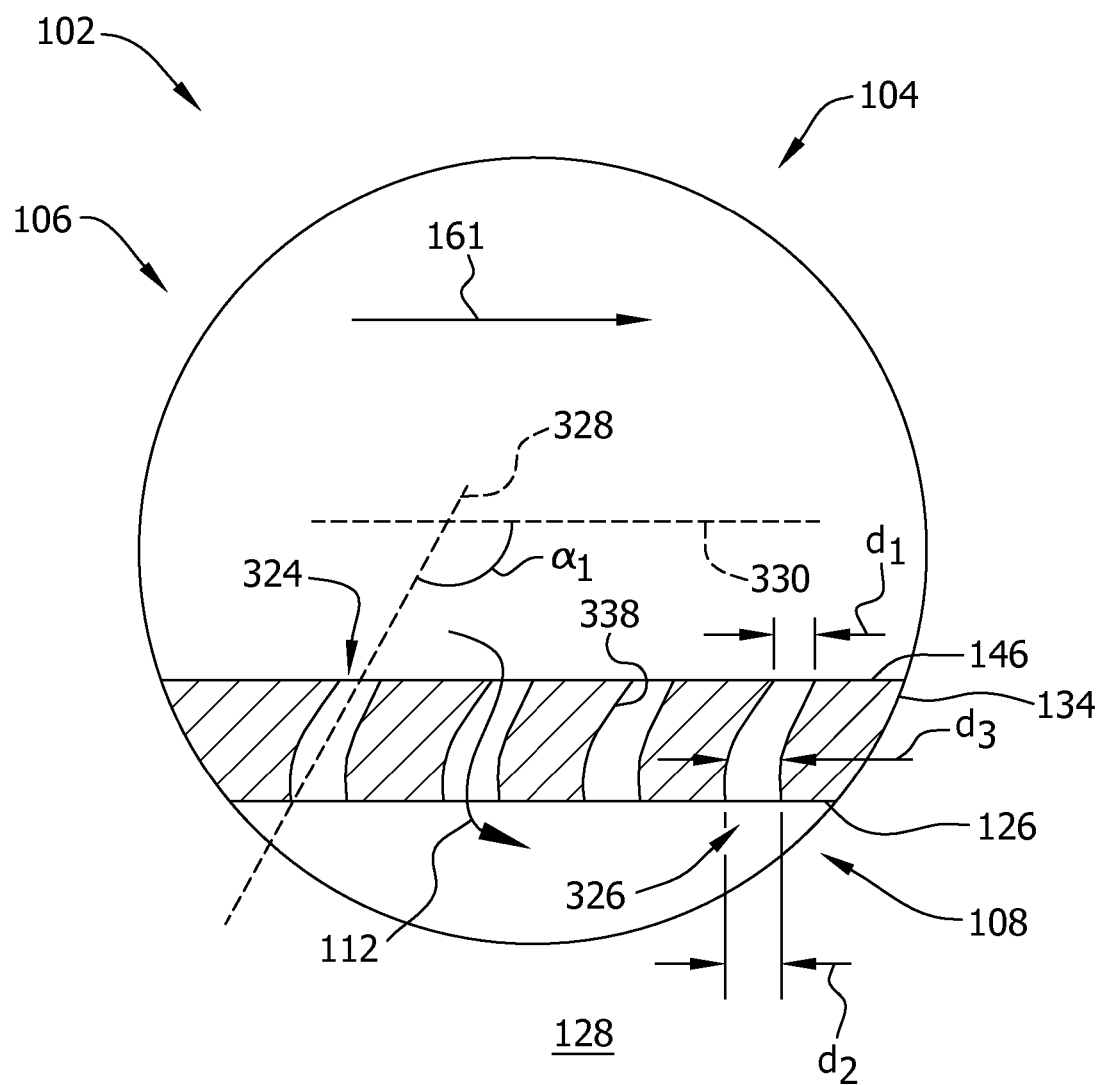

FIG. 9 is an enlarged cross-sectional view of an alternative embodiment of aperture 108 defined through first sidewall 134 of rotor blade 22. Components shown in FIG. 2 and FIG. 3 are labeled with identical reference numbers in FIG. 9. In an alternative embodiment, apertures 108 include an interior opening 324 defined at or within inner surface 146 and an exterior opening 326 defined at or within outer surface 126. Interior opening 324 is configured with a first or inside diameter $d_1$. Exterior opening 326 is configured with a second or outside diameter $d_2$ that, in the alternative embodiment, is larger than first diameter $d_1$. A third diameter $d_3$ is defined at a midsection of aperture 108. Third diameter $d_3$ is larger than first diameter $d_1$ and second diameter $d_2$. In this alternative embodiment, third diameter $d_3$ is positioned at a midpoint along a length of aperture 108 between inner surface 146 and outer surface 126. However, it should be understood that third diameter $d_3$ can be defined at any suitable position between interior opening 324 and exterior opening 326 to allow air distribution system 102 to function as described herein. Interior opening 324 is aligned with exterior opening 326 such that aperture axis 328 is formed. In this embodiment, exterior opening 326 is positioned nearer to blade root 148 than interior opening 324 such that axis 328 intersects with inner surface 146 (represented by phantom line 330) to form an angle $\alpha_1$ ranging from about 90° to about 180°. In this embodiment, angle $\alpha_1$ is at least 90°. In a further embodiment, apertures 108 are at least partially defined by an arcuate wall 338 formed in first sidewall 134 between inner surface 146 and outer surface 126. During operation of air distribution system 102, flow control device 104 channels fluid flow 112 through manifold 106. Debris, suspended in fluid flow 112 is channeled through manifold 106. The diameter $d_1$ of interior opening 324 is sized to facilitate restricting debris from entering aperture 108 as fluid flow 112 moves through manifold 106 and debris is collected in debris collector 107. The density of the debris suspended in fluid flow 112 is greater than that of air, such that debris is channeled through manifold 106 with a higher inertia than fluid flow 112. As fluid flow 112 travels through angle $\alpha_1$ to enter aperture 108, the higher inertia of the debris prevents the debris from traveling through angle $\alpha_1$ into aperture 108, and causes debris to pass over aperture 108 and flow towards debris collector 107.

Figure 10:
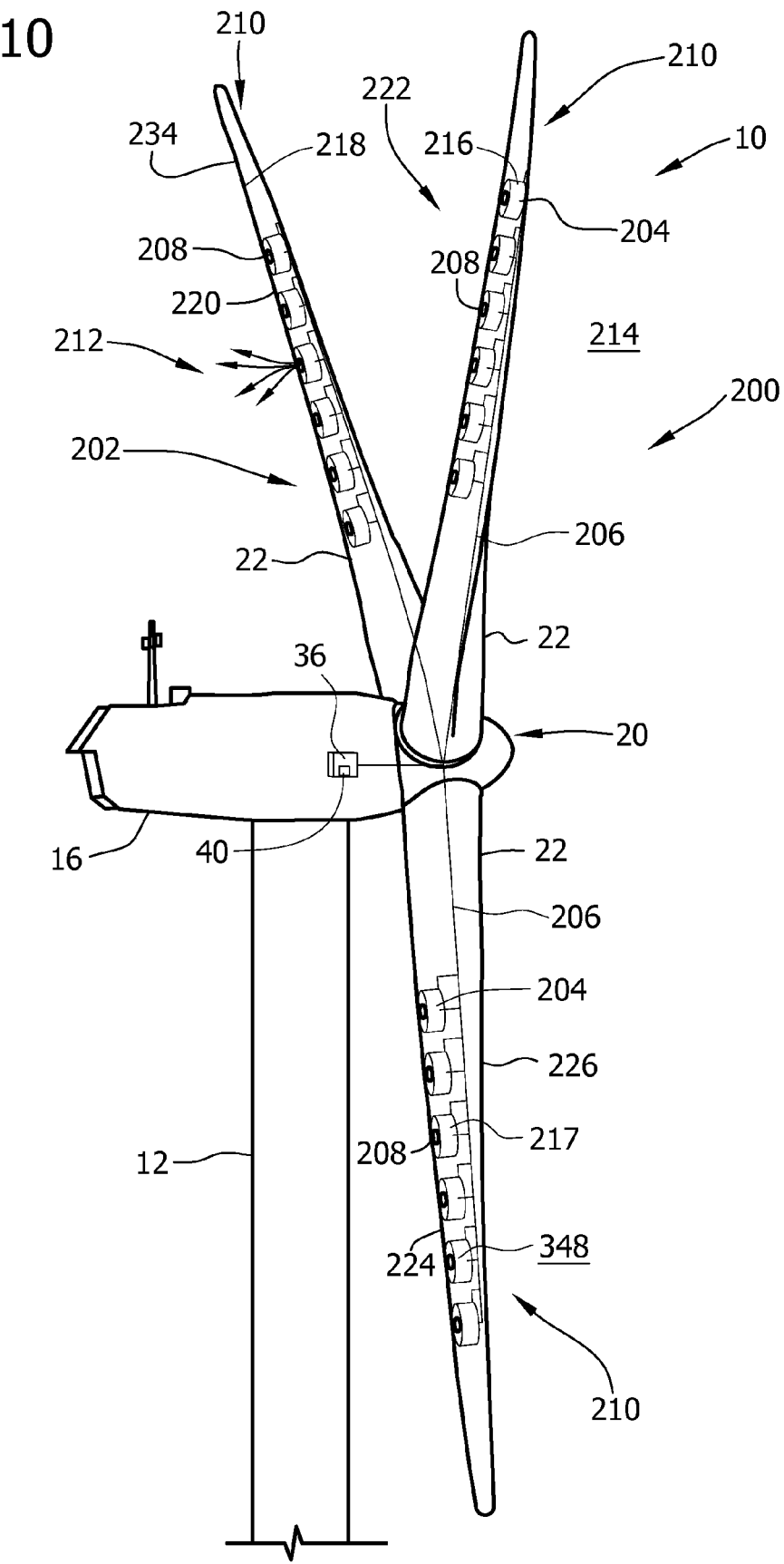

FIG. 10 is a schematic view of an exemplary alternative flow control system 200 that may be used with wind turbine 10. Components shown in FIG. 1 are labeled with identical reference numbers in FIG. 10. In the exemplary embodiment, flow control system 200 is a zero-net-mass flow control system that includes an air distribution system 202. Control system 36 is in operational control communication with flow control system 200 and/or air distribution system 202.

Air distribution system 202 includes at least one actuator 204, at least one communication link 206, and at least one aperture 208. Actuator 204, communication link 206, and aperture 208 define an assembly 210. In the exemplary embodiment, each rotor blade 22 includes a respective assembly 210. As such, in the exemplary embodiment, air distribution system 202 includes a plurality of actuators 204, communication links 206, and apertures 208. Alternatively, air distribution system 202 includes one common communication link 206 for assemblies 210. In an alternative embodiment, at least one rotor blade 22 includes an assembly 210 having communication link 206. In one embodiment, communication link 206 provides operational control communication between control system 36 and at least one actuator 204. In the exemplary embodiment, communication link 206 provides operational control communication between control system 36 and a plurality of actuators 204 within an assembly 210. Communications links 206 may be directly coupled in communication with control system 36 and/or be coupled to control system 36 via a communications hub and/or any other suitable communication device. Actuator 204, communication link 206, and/or aperture 208 are at least partially positioned within or defined in rotor blade 22.

In the exemplary embodiment, actuator 204 is any known or contemplated actuator configured to form a synthetic jet 212 of fluid. As used herein, the term "synthetic jet" refers a jet of fluid that is created by cyclic movement of a diaphragm and/or piston 217, where the jet flow is synthesized from the ambient fluid. Synthetic jet 212 may be considered a fluid flow through flow control system 200. In one embodiment, actuator 204 includes a housing 216 and a diaphragm and/or a piston 217 within housing 216. An annular chamber 348 is defined within housing 216. Diaphragm and/or piston 217 can be mechanically, piezoelectrically, pneumatically, magnetically, and/or otherwise controlled to form synthetic jet 212. In the exemplary embodiment, actuator 204 is coupled to an inner surface 218 of rotor blade 22 and is aligned with corresponding aperture 208 such that synthetic jet 212 and/or ambient air 214 flows through aperture 208.

Aperture 208 is defined within rotor blade 22 and, more specifically, through sidewall 234 of rotor blade 22. Further, in the exemplary embodiment, at least one assembly 210 of air distribution system 202 includes a plurality of actuators 204 and a plurality of apertures 208 that each correspond with an actuator 204. As such, air distribution system 202 includes an array 222 of apertures 208 defined through rotor blade 22. In the exemplary embodiment, apertures 208 are defined along a suction side 224 of each rotor blade 22. Although apertures 208 and/or actuators 204 are shown as being aligned in a line along suction sides 224, it should be understood that apertures 208 and/or actuators 204 may be positioned anywhere along suction side 224 of rotor blade 22 that enables flow control system 200 to function as described herein. In an alternative embodiment, apertures 208 are defined through any suitable side of rotor blade 22, including suction side 224 and/or a pressure side 226, and/or actuators 204 are coupled to inner surface 218 of any suitable side of rotor blade 22. In the exemplary embodiment, aperture 208 is configured to provide flow communication between a respective actuator housing 216 and ambient air 214.

During a flow control operation, flow control system 200 is used to provide AFC for wind turbine 10. More specifically, control system 36 controls air distribution system 202 to draw in ambient air 214 and generate synthetic jet 212 through at least one aperture 208. Operation of one assembly 210 will be described herein, however, it should be understood that each assembly 210 functions similarly. Further, assemblies 210 can be controlled to operate in substantial synchronicity or each assembly 210 may be controlled separately such that a fluid flow about each rotor blade 22 may be manipulated separately. Flow control system 200 can be controlled by control system 36 to maintain a predetermined load spectrum, power level, and/or noise level. In the exemplary embodiment, control system 36 instructs actuator 204 to alternately draw ambient air 214 into housing 216 (also referred to herein as a "breath-in stroke") and discharge synthetic jet 212 (also referred to herein as a "breath-out stroke") from housing 216 using diaphragm and/or piston 217 to generate synthetic jet 212 having one or more predetermined parameters, such as a velocity, a mass flow rate, a pressure, a temperature, and/or any suitable flow parameter. Synthetic jets 212 facilitate manipulating at least a boundary layer of a fluid flow across outer surface 220 of rotor blade 22. More specifically, discharging synthetic jets 212 at suction side 224 of rotor blade 22 increases the lift on rotor blade 22, which increases the power generated by wind turbine 10.

Figure 11:
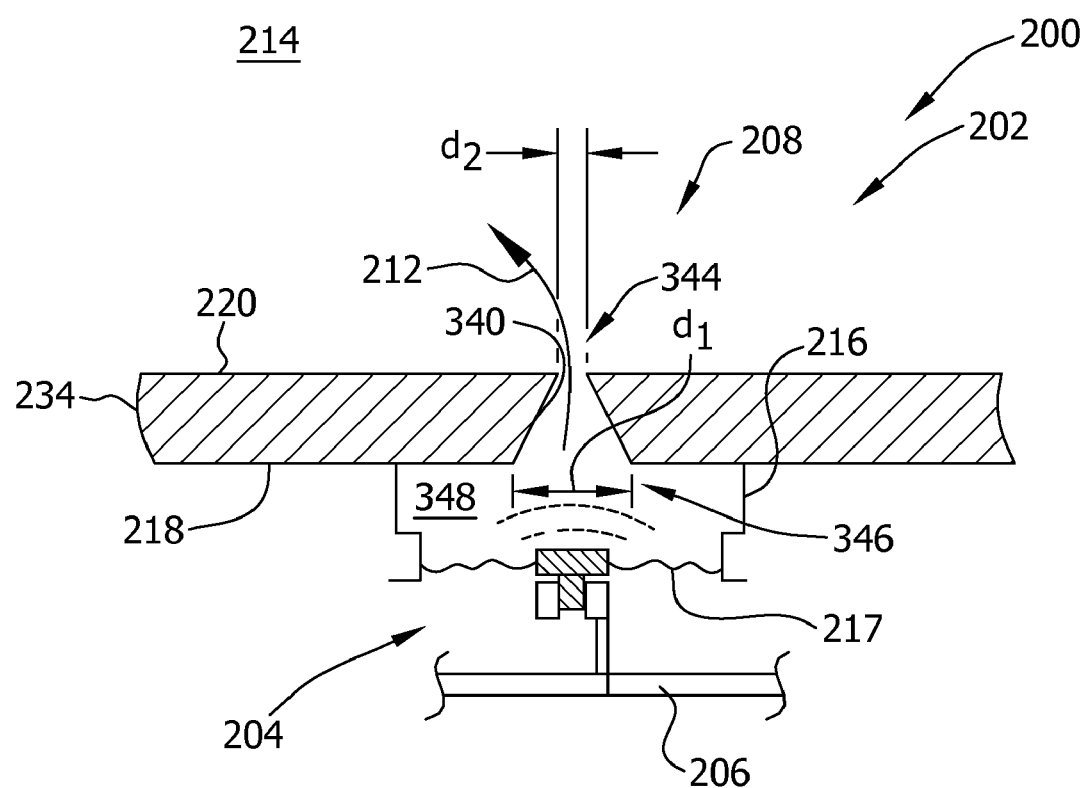

FIG. 11 is an enlarged cross-sectional view of aperture 208. Components shown in FIG. 3 and FIG. 10 are labeled with similar references in FIG. 11. Aperture 208 is defined by a surface 340 extending through sidewall 234 between inner surface 218 and outer surface 220. Aperture opening 344 is defined at outer surface 220. Aperture opening 346 is defined at inner surface 218. Aperture opening 346 is configured with a first or inside diameter $d_1$. Aperture opening 344 is configured with a second or outside diameter $d_2$ that is smaller than first diameter $d_1$. In the exemplary embodiment, annular chamber 348 is in flow communication with ambient air 214 through aperture 208. During operation of air distribution system 202, actuator 204 draws in ambient air 214 into housing 216 and discharges synthetic jet 212 through aperture 208. Opening 344 is configured to facilitate restricting debris suspended in ambient air 214 from entering aperture 208 during the "breath-in stroke". Debris that enters aperture 208 with a diameter smaller than outside diameter $d_2$ of opening 344 is channeled by synthetic jet 112 through aperture opening 346, that has an inside diameter $d_1$ that is larger than outside diameter $d_2$, and out through opening 344 such that the debris does not restrict and/or block flow through aperture 208.

FIG. 12 is a flowchart of an exemplary method 400 for assembling air distribution system 102 suitable for use in rotor blade 22 of wind turbine 10. Method 400 includes coupling 401 manifold 106 to sidewall 134 of rotor blade 22, and defining 402 a plurality of apertures 108 through sidewall 134, such that apertures 108 provide flow communication between manifold passage 155 and ambient air 128. Method 400 further includes coupling 403 debris collector 107 to tip end 118 of manifold 106, and defining 404 opening 152 through sidewall 134 such that opening 152 provides flow communication between debris collector passage 156 and ambient air 128.

The above-described systems and methods facilitate correcting and/or preventing fouling of an airfoil, such as a rotor blade, and/or an active flow control system used with the blade. As such, the embodiments described herein facilitate wide-spread use of active flow control (AFC) in, for example, wind turbine applications. The above-described systems and methods prevent or limit fouling of an AFC system by using a debris collector and a configuration of apertures defined at least partially within a wind turbine. As such, the performance life of the AFC system can be extended because of the reduction in fouling that may occur over the operational life of the AFC system. Further, the above-described system facilitates reducing human operator intervention in the prevention of fouling of the AFC system.

Exemplary embodiments of systems and method for assembling an air distribution system for use in a rotor blade of a wind turbine are described above in detail. The systems and methods are not limited to the specific embodiments described herein, but rather, components of systems and/or steps of the methods may be utilized independently and separately from other components and/or steps described herein. For example, the methods may also be used in combination with other active flow control systems and methods, and are not limited to practice with only the wind turbine systems as described herein. Rather, the exemplary embodiment can be implemented and utilized in connection with many other fouling correction and/or prevention applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling an air distribution system for use in a rotor blade of a wind turbine, the rotor blade including a sidewall extending between a blade root and a blade tip and defining a cavity, the method comprising:
    coupling a manifold to the sidewall within the cavity, the manifold extending from the blade root towards the blade tip, the manifold having a root end and an opposing tip end, and defining a passage from the root end to the tip end;
    defining a plurality of apertures through the sidewall, the plurality of apertures providing flow communication between the passage and ambient air; and,
    coupling a debris collector to the manifold tip end such that a passage of the debris collector is in flow communication with the manifold passage, the debris collector defining an opening providing flow communication between the debris collector passage and ambient air, the debris collector configured to collect debris flowing through from the tip end of the manifold and discharge the debris the opening to the ambient air.

2. The method in accordance with claim 1, wherein each aperture of the plurality of apertures has a first diameter, wherein coupling a debris collector further comprises coupling a debris collector to the manifold tip end, wherein the opening has a second diameter that is larger than the first diameter and configured to discharge debris from the debris collector passage to the ambient air.

3. The method in accordance with claim 1, wherein defining a plurality of apertures comprises:
    defining a first opening of each of the plurality of apertures at an inner surface of the rotor blade sidewall, the first opening having a first diameter; and,
    defining a second opening of each of the plurality of apertures at an outer surface of the rotor blade sidewall, the second opening having a second diameter that is larger than the first diameter, wherein a respective first opening is configured to restrict debris from entering corresponding aperture from the air distribution system and a respective second opening is configured to prevent debris from restricting a flow being discharged from the corresponding aperture.

4. An air distribution system for use in a wind turbine, the wind turbine including at least one rotor blade including a sidewall at least partially defining a cavity extending between a blade root and a blade tip, the air distribution system comprising:
a manifold at least partially positioned within the cavity and extending from the blade root towards the blade tip, the manifold having a root end and an opposing tip end, and the manifold defining a passage from the root end to the tip end;
a plurality of apertures defined through the sidewall, the plurality of apertures providing flow communication between the manifold passage and ambient air; and,
a debris collector coupled to the tip end of the manifold passage, the debris collector comprising a passage in flow communication with the manifold passage and an opening providing flow communication between the debris collector passage and ambient air, the debris collector configured to collect debris flowing from the tip end of the manifold and discharge the debris from the debris collector passage through the opening to the ambient air.

5. The air distribution system in accordance with claim 4, further comprising:
a flow control device operatively coupled to the manifold, the flow control device configured to channel air through the manifold; and,
a controller operatively coupled to the flow control device, the controller configured to direct the operation of the flow control device.

6. The air distribution system in accordance with claim 4, wherein the debris collector has a root end and an opposing tip end, the debris collector passage extends from the root end to the tip end of the debris collector, each aperture of the plurality of apertures having a first diameter, and the opening of the debris collector having a second diameter that is larger than the first diameter.

7. The air distribution system in accordance with claim 4, further comprising a hatch coupled to the sidewall and configured to cover the debris collector opening in a first position, the hatch movable from the first position to a second position to allow access to the debris collector passage.

8. The air distribution system in accordance with claim 7, further comprising an actuator operatively coupled to the hatch and configured to move the hatch between the first position and the second position.

9. The air distribution system in accordance with claim 4, wherein the rotor blade has a blade inner surface and a blade outer surface, each aperture of the plurality of apertures comprising:
a first opening defined at the blade inner surface, the first opening having a first diameter; and,
a second opening defined at the blade outer surface, the second opening having a second diameter that is larger than the first diameter, wherein the first opening is configured to restrict debris from entering the aperture from the air distribution system and the second opening is configured to prevent debris from restricting a flow being discharged from a corresponding aperture.

10. The air distribution system in accordance with claim 4, wherein the rotor blade has a blade inner surface and a blade outer surface, each aperture of the plurality of apertures comprising:
a first opening defined at the blade inner surface having a first diameter, the first opening configured to restrict debris from entering the aperture from the air distribution system; and,
a second opening defined at the blade outer surface, the second opening having a second diameter, the second opening configured to restrict debris from entering the aperture from the ambient air, wherein each aperture has a third diameter at a midsection greater than the first diameter and the second diameter.

11. The air distribution system in accordance with claim 4, wherein the rotor blade has a blade inner surface and a blade outer surface, and each aperture of the plurality of apertures defines an axis and comprises:
a first opening defined at the blade inner surface; and,
a second opening defined at the blade outer surface, the second opening positioned nearer the blade root than the first opening, the axis forming an angle with the blade inner surface that is at least 90 degrees.

12. The air distribution system in accordance with claim 4, wherein each aperture further comprises:
a first opening defined at the blade inner surface, the first opening having a first diameter; and,
a second opening defined at the blade outer surface, the second opening having a second diameter that is larger than the first diameter, wherein the first opening is configured to restrict debris from entering the aperture from the air distribution system.

13. The air distribution system in accordance with claim 11, wherein each aperture is at least partially defined by an arcuate wall formed in the sidewall.

14. The air distribution system in accordance with claim 12, wherein each aperture has a third diameter at a midsection greater than the first diameter and the second diameter.

15. An air distribution system for use in a wind turbine, the wind turbine including at least one rotor blade including a sidewall at least partially defining a cavity extending from a blade root towards a blade tip, the rotor blade having an inner surface and an outer surface, the air distribution system comprising:
a plurality of actuators coupled to the rotor blade and positioned within the cavity, each actuator of the plurality of actuators having a housing and a diaphragm, the housing defining a chamber, the diaphragm configured to intake ambient air into the chamber and eject a jet of air out of the chamber; and,
a plurality of apertures defined through the sidewall, each aperture of the plurality of apertures providing flow communication between the chamber and ambient air, each aperture comprising:
a first opening defined at a blade outer surface, the first opening having a first diameter; and,
a second opening defined at a blade inner surface, the second opening having a second diameter that is larger than the first diameter, the first opening configured to facilitate restricting debris from entering the aperture from ambient air.

16. A wind turbine comprising:
at least one rotor blade including a sidewall at least partially defining a cavity extending between a blade root and a blade tip; and,
an air distribution system at least partially positioned within the rotor blade, the air distribution system comprising:
a manifold at least partially positioned within the cavity and extending from the blade root towards the blade tip, the manifold having a root end and an opposing tip end, the manifold defining a passage from the root end to the tip end of the manifold;

a plurality of apertures defined through the sidewall, the plurality of apertures providing flow communication between the manifold passage and ambient air; and, a debris collector coupled to the tip end of the manifold passage, the debris collector comprising a passage in flow communication with the manifold passage and an opening providing flow communication between the debris collector passage and ambient air, the debris collector configured to collect debris flowing from the tip end of the manifold and discharge the debris from the debris collector passage through the opening to the ambient air.

17. The wind turbine in accordance with claim 16, wherein the debris collector has a root end and an opposing tip end, the debris collector passage extending from the root end of the debris collector to the tip end of the debris collector, each aperture of the plurality of apertures having a first diameter, the debris collector opening having a second diameter that is larger than the first diameter.

18. The wind turbine in accordance with claim 16, wherein the rotor blade has a blade inner surface and a blade outer surface, and each aperture comprises:
a first opening defined at the blade inner surface, the first opening having a first diameter; and,
a second opening defined at the blade outer surface, the second opening having a second diameter that is larger than the first diameter, wherein the first opening is configured to restrict debris from entering the aperture from the air distribution system.

19. The wind turbine in accordance with claim 16, wherein the rotor blade has a blade inner surface and a blade outer surface, and each aperture comprises:
a first opening defined at the blade inner surface having a first diameter, the first opening configured to restrict debris from entering the aperture from the air distribution system; and,
a second opening defined at the blade outer surface, the second opening having a second diameter, the second opening configured to restrict debris from entering the aperture from the ambient air, wherein each aperture has a third diameter at a midsection greater than the first diameter and the second diameter.

20. The wind turbine in accordance with claim 16, wherein the rotor blade has a blade inner surface and a blade outer surface, each aperture defines an axis, and each aperture comprises:
a first opening defined at the blade inner surface, the first opening having a first diameter; and,
a second opening defined at the blade outer surface, the second opening having a second diameter that is larger than the first diameter, the second opening positioned nearer the blade root than the first opening, the axis of the aperture forming an angle with the blade inner surface that is at least 90 degrees, wherein the first opening is configured to restrict debris from entering the aperture from the air distribution system.

* * * * *